(12) United States Patent
Kraus

(10) Patent No.: US 6,336,768 B1
(45) Date of Patent: Jan. 8, 2002

(54) CONNECTION UNIT WITH ELASTIC FLANGE SEAL BETWEEN CONNECTOR PORTIONS AND SEAL RING FOR ENGAGING AN ASSOCIATED SUPPORT SURFACE

(75) Inventor: Willibald Kraus, Grünstadt (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/529,378

(22) PCT Filed: Oct. 14, 1998

(86) PCT No.: PCT/DE98/03019

§ 371 Date: Jun. 8, 2000

§ 102(e) Date: Jun. 8, 2000

(87) PCT Pub. No.: WO99/20907

PCT Pub. Date: Apr. 29, 1999

(30) Foreign Application Priority Data

Oct. 17, 1997 (DE) ..................................... 297 18 487 U

(51) Int. Cl.[7] ................................................ F16B 21/08
(52) U.S. Cl. ...................... 403/408.1; 24/297; 24/453; 411/508; 411/510
(58) Field of Search .............................. 403/408.1, 397, 403/384; 411/510, 451, 48, 60.1, 508, 908; 24/297, 298, 289, 453, 563

(56) References Cited

U.S. PATENT DOCUMENTS 3,577,603 A * 5/1971 Seckerson et al. .......... 411/510
5,173,026 A * 12/1992 Cordola et al. ............. 411/508
5,319,839 A * 6/1994 Shimajiri .................. 24/297 X
5,651,634 A * 7/1997 Kraus ....................... 403/408.1
5,689,863 A * 11/1997 Sinozaki ....................... 24/297
5,704,753 A * 1/1998 Ueno ..................... 411/908 X
6,039,523 A * 3/2000 Kraus ........................... 411/48

* cited by examiner

Primary Examiner—Harry C. Kim
(74) Attorney, Agent, or Firm—Fay, Sharpe, Fagan, Minnich & McKee, LLP

(57) ABSTRACT

The invention relates to a connection unit between a support 3, such as a body part of a motor vehicle, and a plate element, such as the facing of a door. An upper part 1 is attachable to the plate element via an attachment region 5 and an engagement region 6 selectively receives a holding element 2, which is connectable to the support. The engagement region 6 of the upper part 1 consists of two pockets 8, 9, arranged above each other and separated by a cross piece 10. The holding element 2 is equipped, above an attachment region 7, connectable with support 3, with a circumferential elastic sealing lip 27 and two flanges 14, 15 of different elasticity, arranged at axial distance from each other, crosswise to the longitudinal direction L—L defined by the holding element. The flanges are capable of being inserted into pockets 8, 9, whereby the holding element 2 between the sealing lip 27 and the two flanges 14, 15, presents a third elastic flange 45, which acts upon the outer region of a plate 40 of the lower pocket 9. The sealing lip 27 is equipped on the side facing the support 3 with a circumferential sealing element 27'.

20 Claims, 1 Drawing Sheet

CONNECTION UNIT WITH ELASTIC FLANGE SEAL BETWEEN CONNECTOR PORTIONS AND SEAL RING FOR ENGAGING AN ASSOCIATED SUPPORT SURFACE

BACKGROUND OF THE INVENTION

The subject invention is directed to the connector art and, more particularly, to a two-piece connector assembly with improved connection and sealing properties.

Connection units of the type under consideration are commonly used in the automotive art to connect plate elements such as molding strips or the like to body parts of a motor vehicle. Typically, the connection units include a holding element portion selectively attachable to an associated support member such as a motor vehicle body part, and an upper portion selectively connectable to a plate element such as automotive door molding, or the like. The holding element and upper portions are selectively connectable to hold the plate element relative to the support member.

A connector of the general type discussed is illustrated in EP 0 726 401 A1. As shown there, a connection element includes a pair of flanges having mutually different elasticities are disposed in an arrangement adjacent a circumferential elastic sealing lip. The pair of flanges are adapted for lateral insertion in a corresponding set of engagement regions formed in pockets of an upper piece portion of the connector. In its mounted position on an associated support element, the circumferential elastic sealing lip of the connection element is adapted to provide a seal against an upper region of the associated support member.

In addition to the above, another valve of the general type discussed is illustrated in DE 40 14 589 C1 whereat a connection element includes an upper piece selectively fastenable to an associated plate element, a middle piece, and a holding element selectively connectable to an associated support element. The construction of the element taught in this disclosure realizes a tolerance compensation which is especially desirable in the automotive industry. More particularly, tolerance compensation along the plane extending in parallel with the associated support member is highly desirable.

Therefore, a two-piece connection assembly of the type discussed including an upper piece and a holding piece that provides both a high degree of mounting accuracy as well as superb sealing between the connection assembly and the associated support member is highly desirable.

SUMMARY OF THE INVENTION

The subject invention provides a connector system for connecting a first associated member such as an automotive trim part with a second associated member such as a motor vehicle body part. The subject connector system includes an outer member having an upper attachment region for selectively joining the outer member with the first associated member, and a holding member having a lower attachment region for selectively joining the holding member with the second associated member. The outer member includes an engagement region formed between the upper attachment region and a lower plate portion and defining first and second pocket regions separated by a cross piece member. The holding member includes a body portion defining a longitudinal axis and carrying a pair of first and second flange members disposed in a relative spaced apart relationship for selective embedded engagement with the first and second pocket regions when the holding member and outer member are brought into their respective mutual interattached positions.

In accordance with an aspect of the invention, the holding member includes an elastic sealing lip member carrying a circular sealing element positioned to engage the second associated support member when the holding member is attached thereto. Still further, a third elastic flange member is positioned between the second flange member and the elastic sealing lip member for selective engagement with the lower plate portion of the outer member.

One advantage of the above arrangement is a simplification in installation of the subject connector system and, additionally, accurate seating of the holding piece in the upper component so that undesirable motion between the components is avoided. Moreover, the sealing element provides a sealing function between the associated support member and the holding member embedded in an opening therein.

In accordance with a further aspect of the invention, the third flange includes, at an outer circumference thereof, a circumferential sealing ring oriented toward the outer region of the plate member to engage a lower surface of the plate member. This results in the benefit of accurate improved accuracy of placement and locating of the upper component at the engagement region.

In accordance with yet another aspect of the invention, the diameter of the third flange is smaller than the diameter of the first flange and larger than the diameter of the second flange.

In accordance with yet another aspect of the invention, the sealing element is formed as a foamed plastic body. Preferably, the sealing element and the sealing lip are manufactured using a two-component injection molding process. In addition, the sealing element is alternatively formed as a circumferential elastic ring to assure improved sealing between the holding member and the associated support aperture.

As can be seen from the foregoing, a primary object of the invention is the provision of a connector system which enables precise relative positioning of the associated parts forming the connector system and, additionally, provides improved sealing between the connector system and an associated support member.

Still other aspects, advantages, and benefits the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
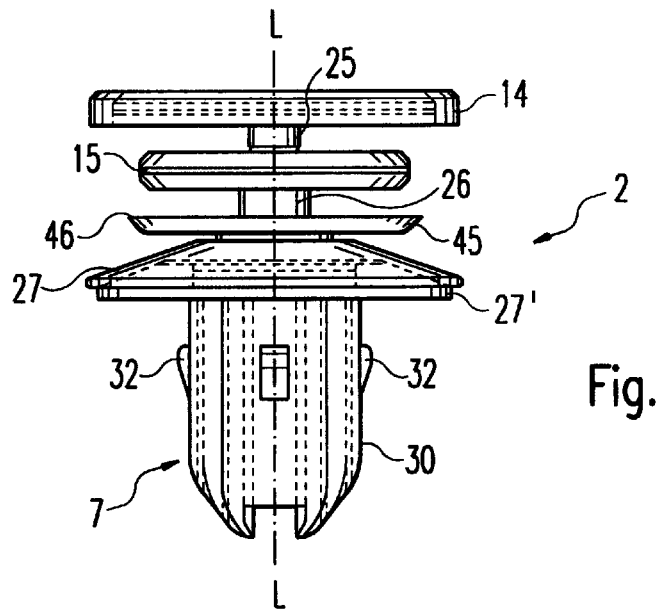
FIG. 1 is a side elevational view of a holding element formed in accordance with the present invention.
Figure 3:
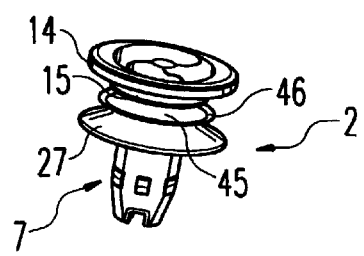

Referring now to the drawings wherein the showings are for the purposes of illustrating the preferred embodiment of the invention only and not for purposes of limiting same, the overall arrangement of the preferred form of a holding element 2 can best be seen with reference to FIGS. 1 and 3. As shown there, the holding element 2 comprises, in essence, a lower attachment region 7, an elastic sealing lip 27 arranged above the lower attachment region 7, and a set of three flange members 45, 15, and 14. An attachment or connection neck 25 is provided on the holding element 2 between the first and second flange members 14 and 15 as shown. In addition, an attachment neck 26 is provided between the second flange 15 and the third elastic flange member 45.

In its preferred form, the attachment region 7 is fashioned as an anchor or cylindrical foot-type arrangement 30 provided with elastic locking elements 32. In accordance with the location of the attachment necks 25, 26 on the holding member 2, the first and second flange members 14 and 15 are disposed on the holding member 2 in a spaced apart relationship along a longitudinal axis L—L generally defined by the body of the holding member 2. The third elastic flange member 45 is disposed in a close adjacent relationship to the elastic sealing lip 27 and preferably includes a circumferential sealing ring 46 at its outer circumference.

In accordance with the preferred form of the holding member 2, the diameter of the third flange 45 is smaller than the diameter of the first flange 14 and, further, is greater than the diameter of the second flange 15.

With continued reference to FIG. 1, a further sealing element 27' is provided on the underside of the sealing lip member 27. Preferably, the sealing element 27' is formed from a foamed plastic body in the shape of a ring. Based on this construction, in accordance with the present invention, the sealing lip, together with the pair of flanges and, additionally, together with the sealing element 27' having a foamed plastic body are produced using a two-component injection molding process.

As can be further seen with reference particularly to FIG. 1, the upper flange 14 has a larger diameter than the lower flange 15. Further, the lower connection neck 26 has a larger diameter than the upper connection neck 25. Preferably, however, both of the attachment or connection necks 25, 26 have a substantially overall cylindrical form for selective connection with the upper components in a manner to be described below.

Figure 2:
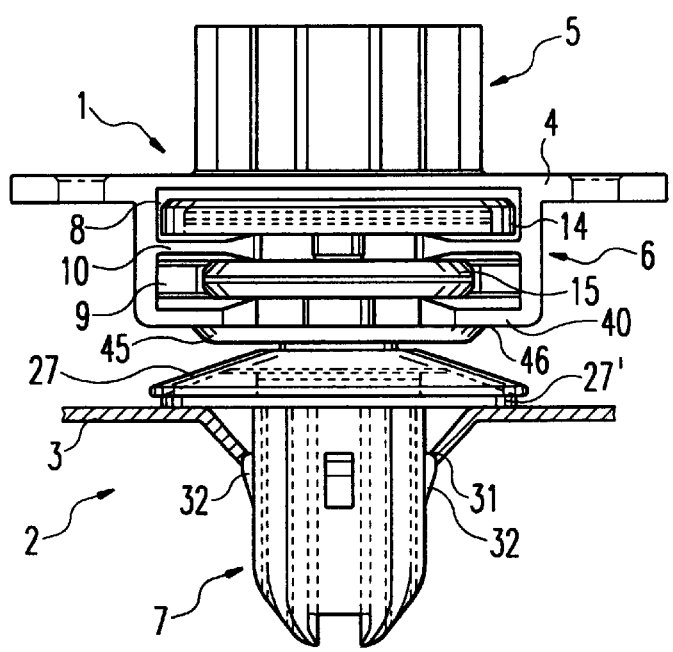
FIG. 2 is a side elevational view illustrating the preferred connection of an upper component with the holding element shown in FIG. 1; and, FIG. 3 is a perspective view of the holding element shown in FIG. 1.

With reference next to FIG. 2, the upper component 1 is shown in a mounted position relative to the lower holding member 2. The upper connection component 1 includes an attachment region 5 which may take on any shape or form as desired for attachment to an associated member such as an automotive molding member, or the like. Further, the upper component 1 includes an attachment region 6 which, preferably, has a rectangular form and is provided with first and second pocket regions 8, 9 separated from each other by a cross piece 10. The lower pocket 9 terminates at a lower plate portion 40.

The cross piece 10 and the lower plate portion 40 each preferably include an insertion slot (not shown) adapted to receive the connection necks 25 and 26 of the holding component 2 represented in FIG. 1. Preferably, the insertion slots include a first insertion guide region formed in the shape of a cone to help guide the connection necks toward the central region of the upper component. Therebeyond, at the central region of the upper component 1, locating apertures having a larger diameter are provided so that, upon lateral insertion of the holding component 2 into the upper component 1, simple and positive interconnection is achieved.

In the relative mounted position between the outer member 1 and the holding member 2, the pair of flanges 14 and 15 are each respectively received within the first and second pocket regions 8 and 9. Additionally, the third elastic flange member 45 is formed to act upon the outer region of the lower plate portion 40 thereby further assuring an accurate seating of the holding element 2 withing the upper component 1.

Still further, as shown in FIG. 1, the sealing ring 46 of the third elastic flange member 45 is adapted to act upon the outer region of the lower plate portion 40 and, thus, further produces a sealing effect.

Additionally, as further shown in FIG. 2, following completed installation of the holding element 2 into the outer member 1, the lower attachment region 7 of the holding member 2 is preferably inserted into an aperture 31 of an associated support member 3. A set of resilient locking elements 32 preferably engage behind latch portions formed by the support member 3 and extending into the aperture 31 to ensure positive attachment of the lower attachment region 3 relative to the associated support member 3.

In the installed position shown in FIG. 2, the sealing element 27' engages the upper side surface of the support member 3 to realize sealing relative to the support aperture 31. Preferably, the sealing element 27' is formed as a foamed plastic body and, accordingly, provides excellent sealing properties.

In accordance with one significant aspect of the invention, by providing a third elastic flange member 45 in a manner substantially as shown, particularly, outside from the first and second pocket regions 8 and 9 of the upper component 1, relative positioning accuracy between the holding member and upper member is realized. Further, in accordance with another important aspect of the invention, the sealing element 27' carried on the elastic sealing lip member 27 provides improved sealing of the holding member 2 relative to the aperture 31 of the associated support member 3.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A connection unit for use between an associated support and an associated plate element, the connection unit comprising:

an upper part attachable to the plate element via an attachment region and a holding element including an engagement region which is connectable with the support, wherein the engagement region of the upper part consists of two pockets arranged above each other and separated by a cross piece and wherein the holding element is equipped above an attachment region connectable with the support with a circumferential elastic sealing lip and with two flanges having different elasticity, arranged at an axial distance from each other, relative to a longitudinal axis defined by the holding element, the flanges being positioned for insertion into said pockets when the upper part is connected with the holding element following relative motion between the upper part and the holding element in a direction cross-wise to the longitudinal axis, the holding element including a third elastic flange disposed between the sealing lip and the two flanges which acts upon an outer region of a plate of the lower pocket, the sealing lip being provided on a side facing the support with a circumferential sealing element.

2. The connection unit according to claim 1 wherein said third flange carries an outer circumferential sealing ring oriented towards said outer region of said lower plate member.

3. The connection unit according to claim 1 wherein a diameter of said third flange is smaller than a diameter of said first flange and greater than a diameter of the second flange.

4. The connection unit according to claim 1 wherein said sealing element is foamed plastic.

5. The connection unit according to claim 4 wherein said sealing element and said sealing lip are manufactured by a two-component injection molding process.

6. The connection unit according to claim 4 wherein said sealing element is formed as a ring.

7. A connector system for connecting a first associated member with a second associated member, the connector system comprising:

an outer member having an upper attachment region for selectively joining the outer member with the first associated member, the outer member including an engagement region formed between the upper attachment region and a lower plate portion, the engagement region defining first and second pocket regions separated by a cross piece member; and, a holding member having a lower attachment region for selectively joining the holding member with the second associated member and having an elastic sealing lip member carrying a circumferential sealing element positioned to engage the second associated member when the holding member is joined with the second associated member, the holding member including a body portion defining a longitudinal axis, and carrying a pair of first and second flange members disposed in a relative spaced apart relationship for selective embedded engagement with said first and second pocket regions when the outer member and the holding member are brought together in a direction transverse said longitudinal axis, the holding member further including a third elastic flange member positioned between the second flange member and the elastic sealing lip member for selective engagement with said lower plate member when the holding member is joined with the second associated member.

8. The connector system according to claim 7 wherein the first and second flange members have mutually different elasticities.

9. The connector system according to claim 7 wherein the third elastic flange member carries an outer circumferential sealing ring adapted to engage an outer region of the lower plate portion when the outer member and the holding member are brought together in said direction transverse said longitudinal axis.

10. The connector system according to claim 7 wherein:
a diameter of the third elastic flange member is less than a diameter of the first flange member; and,
the diameter of the third elastic flange member is greater than a diameter of the second flange member.

11. The connector system according to claim 7 wherein the circumferential sealing element is a foamed elastic body member.

12. The connector system according to claim 7 wherein the circumferential sealing element and the elastic sealing lip member are formed using a two-component injection molding process.

13. The connector system according to claim 7 wherein the circumferential sealing element is ring shaped.

14. A holding element for use in a two-piece connection system including an outer member including an engagement region having a lower plate portion and defining first and second pocket connection regions separated by a cross piece member, the holding element comprising:

a lower attachment region for selectively joining the holding member with an associated support member;

an elastic sealing lip member positioned to engage the associated support member when the holding element is selectively joined with the associated support member;

a body portion defining a longitudinal axis and carrying a pair of first and second flange members disposed in a relative spaced apart relationship for selective embedded attachment with said first and second pocket connection regions when the holding element and the outer member are brought together in a direction transverse said longitudinal axis; and, a third elastic flange member positioned between the second flange member and the elastic sealing lip member for selective engagement with the lower plate portion when the outer member is joined with the holding member.

15. The holding element according to claim 14 wherein the first and second flange members have mutually different elasticities.

16. The holding element according to claim 14 wherein the third elastic flange member carries an outer circumferential sealing ring adapted to engage the lower plate portion when the outer member and the holding member are selectively attached.

17. The holding element according to claim 14 wherein:
the third elastic flange member defines a diameter less than a diameter of the first flange member; and,
the diameter of the third elastic flange member is greater than a diameter of the second flange member.

18. The holding element according to claim 14 wherein the elastic sealing lip member is a foamed elastic body member.

19. The holding element according to claim 18 wherein the circumferential sealing element and the elastic sealing lip member are formed using a two-component injection molding process.

20. The holding element according to claim 14 wherein the elastic sealing lip member is ring shaped.

* * * * *